(12) United States Patent
Horstman (10) Patent No.: US 9,227,478 B2
(45) Date of Patent: Jan. 5, 2016

(54) VEHICLE WITH AUTOMATICALLY LEANABLE WHEELS

(71) Applicant: DEERE & COMPANY, Moline, IL (US)

(72) Inventor: Nathan Joseph Horstman, Durango, IA (US)

(73) Assignee: DEERE & COMPANY, Moline, IL (US)

( * ) Notice: Subject to any disclaimer, the term of this patent is extended or adjusted under 35 U.S.C. 154(b) by 57 days.

(21) Appl. No.: 14/133,043

(22) Filed: Dec. 18, 2013

(65) Prior Publication Data

US 2015/0165856 A1 Jun. 18, 2015

(51) Int. Cl.
*B60G 17/00* (2006.01)
*E02F 3/84* (2006.01)

(52) U.S. Cl.
CPC ............... *B60G 17/00* (2013.01); *E02F 3/845* (2013.01)

(58) Field of Classification Search
CPC ..... B60G 17/00; B60G 2200/46; E02F 3/844; E02F 3/845; E02F 3/847; E02F 3/848; E02F 3/84
USPC .............................................. 701/50; 172/4.5
See application file for complete search history.

(56) References Cited

U.S. PATENT DOCUMENTS

| | | | | |
|---|---|---|---|---|
| 5,105,895 A | * | 4/1992 | Kyrtsos | 177/25.14 |
| 5,265,356 A | * | 11/1993 | Winter | 37/234 |
| 6,129,156 A | * | 10/2000 | Boast et al. | 172/4.5 |
| 6,644,429 B2 | * | 11/2003 | Evans et al. | 180/307 |
| 7,480,579 B2 | * | 1/2009 | Lueschow et al. | 702/101 |
| 8,412,420 B2 | | 4/2013 | Ruhter et al. | |
| 2006/0191692 A1 | * | 8/2006 | Holt et al. | 172/2 |
| 2006/0220335 A1 | * | 10/2006 | Damm | 280/86.757 |
| 2008/0100017 A1 | * | 5/2008 | Bitter | 280/124.16 |
| 2009/0206589 A1 | * | 8/2009 | Osswald et al. | 280/782 |
| 2012/0073890 A1 | * | 3/2012 | Bindl et al. | 180/69.6 |
| 2012/0150390 A1 | * | 6/2012 | Ruhter et al. | 701/42 |
| 2012/0160526 A1 | * | 6/2012 | Padilla | 172/4.5 |
| 2012/0174549 A1 | * | 7/2012 | Schroeder et al. | 56/10.2 E |
| 2013/0090817 A1 | * | 4/2013 | Hayashi et al. | 701/50 |

* cited by examiner

*Primary Examiner* — James English (57) ABSTRACT

A work vehicle includes one or more leanable wheels, in which the lean angle of each leanable wheel is automatically controlled according to one or more external factors. Factors influencing the lean angle of each leanable wheel may include: draft load arising from externally imposed forces, such as forces arising from moving earthen materials with a vehicle-mounted moldboard; the rotational position of such a moldboard with respect to direction of travel; turning radius of the vehicle during a turning maneuver; engine speed and/or transmission gear; and the angle of the vehicle itself with respect to vertical (i.e., whether the vehicle is on sloped ground). A control system may automatically adjust wheel-lean depending on inputs indicative of any combination of the above-mentioned external factors.

24 Claims, 8 Drawing Sheets

VEHICLE WITH AUTOMATICALLY LEANABLE WHEELS

TECHNICAL FIELD

The present disclosure relates to a wheel control system of a work vehicle. More particularly, the present disclosure relates to a work vehicle having selectively leanable wheels which are automatically leaned based on one or more work conditions.

BACKGROUND

A typical motor grader has two front traction wheels (a left and a right) which can lean relative to neutral to one side or the other such that each front wheel assumes a present wheel-lean angle from neutral. Wheel-lean is provided in order to counteract lateral forces (i.e., side-draft) caused by a moldboard angle of the moldboard of the motor grader.

Moldboard angle may be used in a variety of applications, ditching (i.e., cutting a ditch) and road maintenance (e.g., snow removal) being but two examples. Ditching typically involves large lateral forces, more so than typical road maintenance involving less material, and thus calls for more wheel-lean than road maintenance. For example, it is known for an operator to perform a first job at a first job site (e.g., ditching) using wheel-lean at a first wheel-lean angle, transition to a second job site with zero wheel-lean (e.g., traveling over the road), and perform a second job at a second job site (e.g., road maintenance) with wheel-lean at a second wheel-lean angle different from the first wheel-lean angle. Wheel-lean is sometimes changed when turning between passes to sharpen the turn. Wheel-lean is also used to make small steering corrections.

Neutral for a front traction wheel may assume a variety of orientations. It is known for neutral to be a normal to the surface on which the front wheels are positioned (e.g., the ground), the normal being vertical in the case of a flat, horizontal surface. Positive or negative camber can also be used.

The front wheels of a typical motor grader are leanable from neutral in order to change a present wheel-lean angle of the front wheels. With respect to each front wheel, a zero present wheel-lean angle means that the center-line of the wheel running through the top and bottom of the wheel is at neutral such that the present wheel-lean angle of the wheel relative to neutral is zero degrees. A non-zero present wheel-lean angle means that the wheel center-line is leaning or angled laterally to the left or right from neutral.

In some cases, the front wheels may be connected to one another for coordinated wheel-lean of the front wheels. For example, some motor graders have a front axle coupled pivotally to the main frame of the front section of the motor grader. At each end of the front axle is a yoke coupled pivotally to the axle. The left and right yokes are coupled pivotally respectively to left and right spindles using respective upper and lower kingpins. The left and right spindles are fastened respectively to left and right final drives, which are, in turn fastened respectively to the left and right front wheels. A hydraulic wheel-lean cylinder is coupled pivotally to the front axle and to, for example, the left yoke. The front wheels are connected to one another via a wheel-lean bar coupled to the yokes such that extension or retraction of the wheel-lean cylinder causes the present wheel-lean angles of the front wheels to change. The front wheels are thus coupled to opposite ends of a front axle to move relative thereto to lean at a present wheel-lean angle from neutral.

A human operator can control wheel-lean from the operator's station with an input device (e.g., a control lever), which may be operatively connected to a controller. One example system and method for manually controlling the angle of wheel-lean is described in U.S. Pat. No. 8,412,420, filed Dec. 14, 2010 and entitled Wheel Lean Control, the entire disclosure of which is hereby expressly incorporated herein by reference.

In addition to wheel-lean controls, a motor grader operator may control several other machine systems and variables. In some cases, multiple machine systems must be controlled simultaneously. For example, when changing direction during a grading operation, a motor grader operator may make adjustments to one or more of the following controls: right hand blade lift, left hand blade lift, rotational orientation of the moldboard, articulation and steering of the front and rear of the vehicle, moldboard side-shift, circle side-shift, vehicle speed, and transmission gear. In some instances, the need to manage these various factors simultaneously may impose a barrier to productivity.

SUMMARY

The present disclosure provides a work vehicle including one or more leanable wheels, in which the lean angle of each leanable wheel is automatically controlled according to one or more external factors. Factors influencing the lean angle of each leanable wheel may include: draft load arising from externally imposed forces, such as forces arising from moving earthen materials with a vehicle-mounted moldboard; the rotational position of such a moldboard with respect to direction of travel; turning radius of the vehicle during a turning maneuver; engine speed and/or transmission gear; and the angle of the vehicle itself with respect to vertical (i.e., whether the vehicle is on sloped ground). A control system may automatically adjust wheel-lean depending on inputs indicative of any combination of the above-mentioned external factors.

According to an embodiment of the present disclosure, a work vehicle is provided including: a chassis; at least one traction device supporting the chassis on the ground, the at least one fraction device operable to lean relative to the chassis such that a wheel-lean angle is defined by the at least one traction device; a sensor positioned to sense a vehicle parameter including at least one of a draft load exerted upon the chassis or a transverse inclination of the chassis; a wheel-lean actuator coupled to the traction device to lean the traction device; a control unit configured to receive a signal transmitted from the sensor and determine a desired wheel-lean angle based at least in part thereon, the control unit further configured to control the wheel-lean actuator based at least in part on the desired wheel-lean angle.

According to another embodiment of the present disclosure a work vehicle is provided including: a chassis; a moldboard rotatably mounted to the chassis; at least one traction device supporting the chassis on the ground, the at least one traction device operable to lean away from a neutral orientation relative to the chassis such that a wheel-lean angle is defined by the at least one traction device; a wheel-lean angle sensor positioned to sense an indication of an actual wheel-lean angle; a sensor positioned to sense a force exerted upon the moldboard and transferred to the chassis; a wheel-lean actuator coupled to the traction device to lean the traction device relative to the neutral orientation; and a control unit configured to receive a signal transmitted from the sensor and determine a desired wheel-lean angle based at least in part thereon, the control unit further configured to receive a signal transmitted by the wheel-lean angle sensor, the control unit further configured to determine a disparity between the desired wheel-lean angle and sensed actual wheel-lean angle, the control unit further configured to control the wheel-lean actuator to reduce the disparity when the disparity is above a threshold.

According to yet another embodiment of the present disclosure, a method of operating a work vehicle is provided, the work vehicle including a chassis and at least one traction device supporting the chassis on the ground, the at least one traction device defining a wheel-lean angle, the method including the steps of: manually controlling at least one vehicle function, the at least one vehicle function being at least one of vehicle speed, orientation and position of a moldboard, transmission gear, vehicle steering, or vehicle articulation; using a control unit to control the wheel-lean angle such that: the control unit measures at least one of a draft load exerted upon the chassis or a transverse inclination of the chassis by receiving a first signal from a sensor; the control unit processes the first signal into a desired wheel-lean angle; the control unit controls a wheel-lean actuator such that the wheel-lean actuator changes the wheel-lean angle of the traction device to the desired wheel-lean angle.

According to still another embodiment of the present disclosure, a method of controlling a wheel-lean angle of a traction device of a vehicle is provided, the method including: sensing at least one of a draft load exerted upon a chassis of the vehicle or a transverse inclination of the chassis, the step of sensing accomplished by transmitting a first signal to a control unit, the first signal emitted by a sensor indicative of the draft load; processing the first signal into a desired wheel-lean angle using the control unit; emitting an actuation signal from the control unit to actuate a wheel-lean actuator, such that the wheel-lean actuator changes the wheel-lean angle of the traction device to the desired wheel-lean angle.

BRIEF DESCRIPTION OF THE DRAWINGS

The above-mentioned and other features and advantages of this disclosure, and the manner of attaining them, will become more apparent and the invention itself will be better understood by reference to the following description of embodiments of the invention taken in conjunction with the accompanying drawings, wherein.

Corresponding reference characters indicate corresponding parts throughout the several views. The exemplifications set out herein illustrate example embodiments of the invention and such exemplifications are not to be construed as limiting the scope of the invention in any manner.

DETAILED DESCRIPTION

Figure 1:
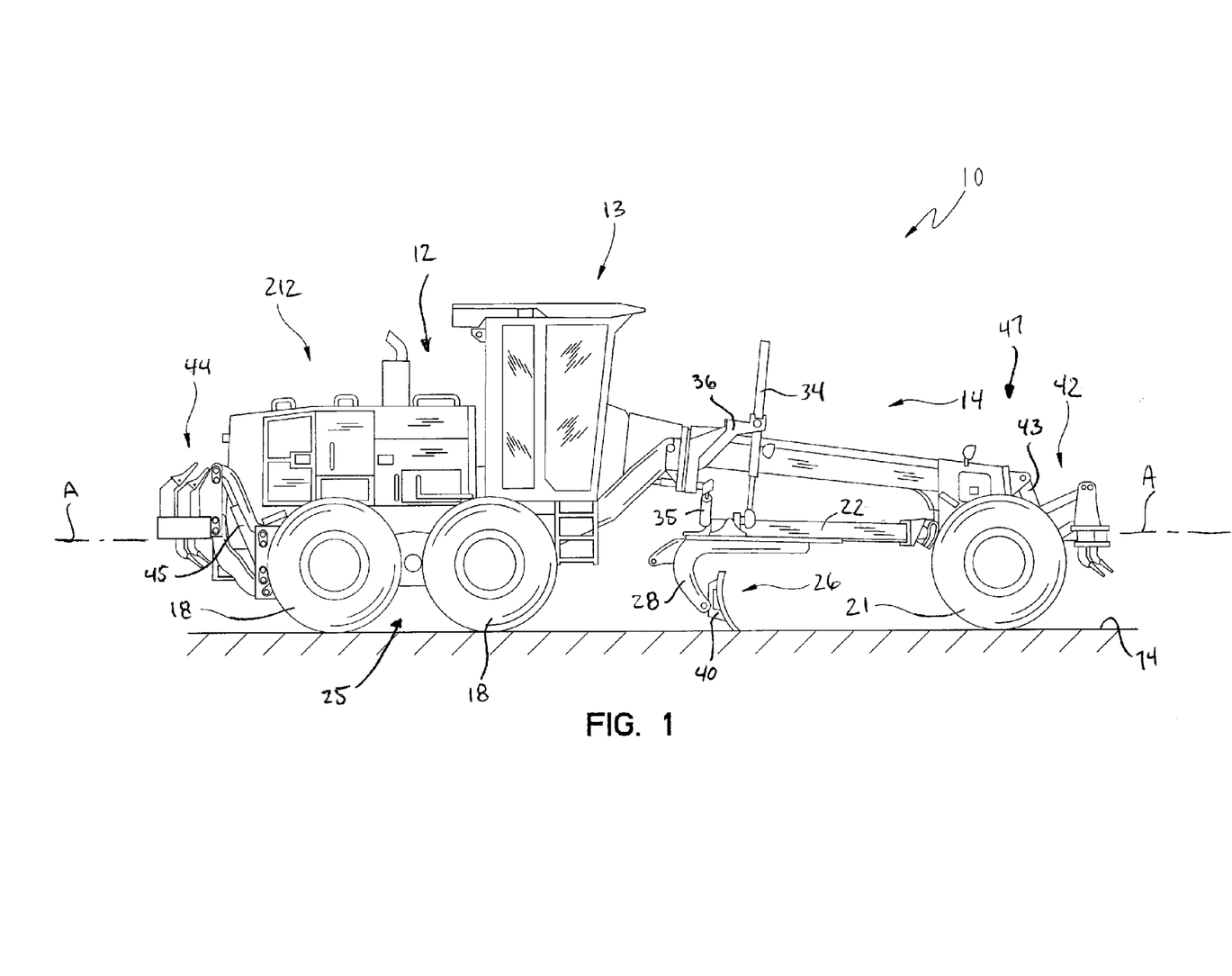
FIG. 1 is a side elevation view of an example motor grader in accordance with the present disclosure.

Referring initially to FIG. 1, a work vehicle 10 is shown in the form of motor grader. Alternatively, work vehicle 10 may also be in the form of any other vehicle, including a vehicle designed for use in off-highway environments such as a loader, excavator, bulldozer, or another construction, agricultural, or utility vehicle, for example. Additional details of an example motor grader are provided in U.S. Pat. No. 6,644,429, filed Jan. 28, 2002 and entitled Hydrostatic Auxiliary Drive System, the entire disclosure of which is hereby expressly incorporated by reference herein.

Motor grader 10 shown in FIG. 1 can be used for spreading and leveling earthen materials such as dirt, gravel, snow and sand, or other materials using moldboard 26. As described in detail below, vehicle 10 includes automatically leanable front wheels 20, 21 selectively controlled by control unit 310 (FIG. 7), such that a vehicle operator can shift his or her focus to controlling movement of vehicle 10 and adjustment of moldboard 26. The other functions of vehicle 10, including control over vehicle speed, the orientation and position of moldboard 26, selection of a transmission gear, and vehicle steering and articulation may be controlled manually by the vehicle operator.

1. Grader System and Functions

Figure 2:
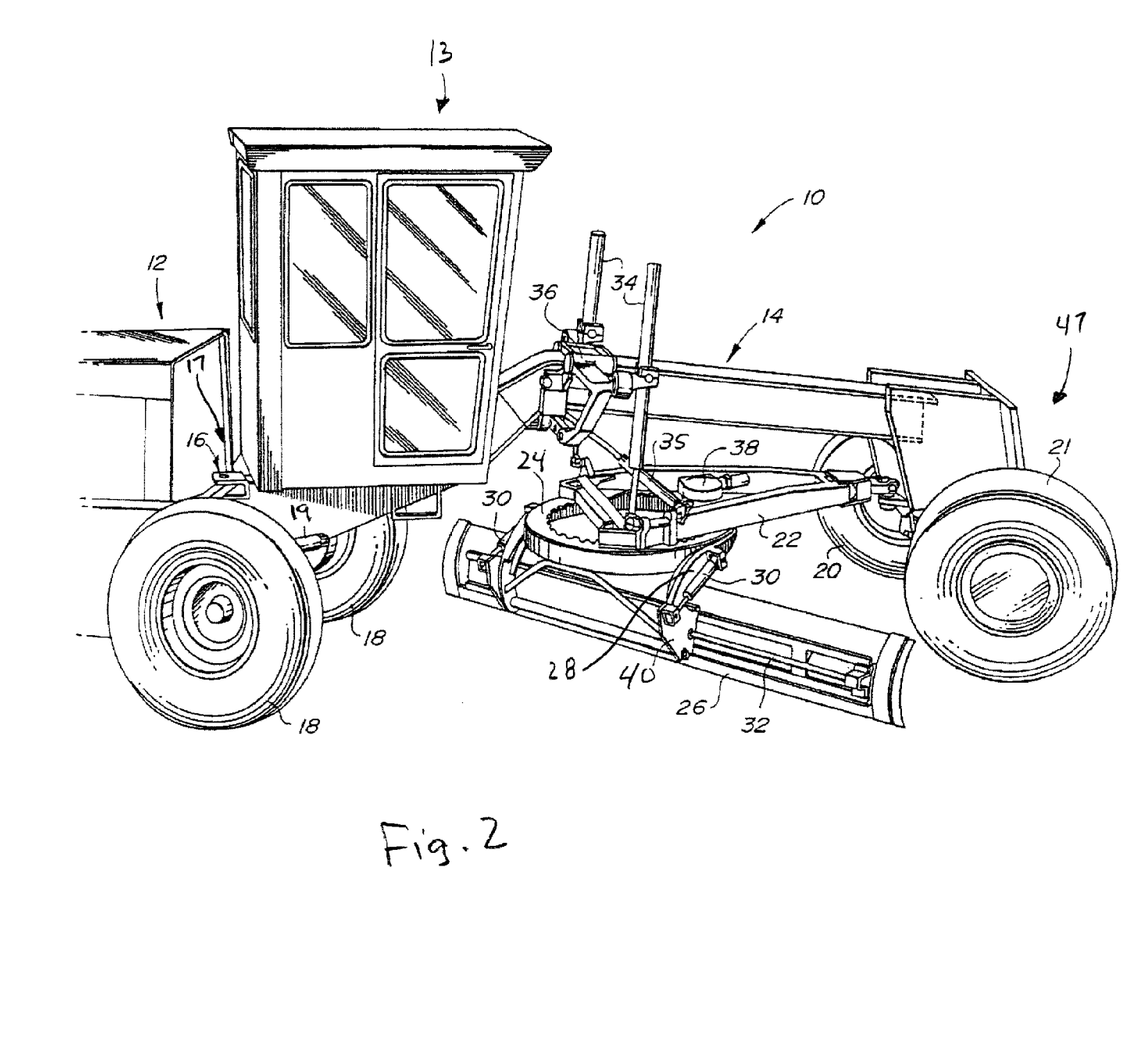
FIG. 2 is a perspective view of a portion of the motor grader shown in FIG. 1.

Grader 10 includes a main frame 12 and an articulated frame 14 which is pivotable with respect to main frame 12 about articulation joint 17, which includes vertical pivot 16 (FIG. 2). Such articulation effects steering of the vehicle 10 left and right using a right articulation cylinder 19 and a left articulation cylinder (not shown, but understood to be arranged symmetrically to right cylinder 19 about fore-aft axis A of vehicle 10). These left and right articulation cylinders are coupled to and extend between the main frame 12 and articulated frame 14, as shown, such that extension and contraction of the articulation cylinders reconfigures frames 12, 14 from a straight orientation 64 (FIG. 9A) to a turned orientation defining articulation angle θ (further described below). Terms such as "left" and "right" are relative to a central fore-aft axis A of the vehicle 10.

Operator cab 13 is mounted atop articulated frame 14. Operator cab 13 includes operator controls, such as advanced display unit 328 shown in FIG. 8 and described in detail below, such that a human operator can control the vehicle 10.

In the illustrated embodiment, motor grader 10 has two leanable front traction wheels 20, 21 and four non-leanable rear fraction wheels 18. All of wheels 18, 20, and 21 are operably coupled to engine 212 such that wheels 18, 20, 21 may be selectively driven to propel frames 12 and 14 respectively along the ground. In particular, main frame 12 supports internal combustion engine 212 (e.g., a diesel engine) of the vehicle 10, and a tandem 25 on each side of the vehicle 10, only the right tandem being shown. Each tandem 25 has two fraction wheels 18 that may be driven by engine 212 of the vehicle 10 through a transmission for propulsion of the vehicle 10, each tandem 25 having a chain drive with two chains each between a tandem axle (not shown) and a respective wheel 18. The main frame 12 thus has four of the six traction wheels of the vehicle 10, two on the left with one in front of the other and two on the right with one in front of the other. Although traditional tire-clad wheels 18, 20 and 21 are shown in the example embodiment illustrated in the figures, it is within the scope of the present disclosure that other traction devices may be used, such as tracks, skis, or any other suitable traction devices. Moreover, it is appreciated that certain traction devices, such as tracks, include wheels are therefore may be considered "wheels" for purposes of the present disclosure.

The articulated frame 14 includes moldboard 26 mounted thereto. The moldboard 26 is configured for spreading, leveling or otherwise moving earthen or other material. In order to facilitate such operations, moldboard 26 is mounted to frame 14 such that moldboard 26 is selectively moveable in a number of directions. A draft frame 22 is coupled to articulated frame 14 toward the front via a ball-and-socket joint. A circle frame 28 is coupled to the draft frame 22 to rotate relative thereto by use of a circle drive 38 mounted to the draft frame 22. A tilt frame 40 holds the moldboard 26 and is coupled pivotally to the circle frame 28 for pivotal movement of the tilt frame 40 and the moldboard 26 held thereby relative to the circle frame 28 about a tilt axis by use of a tilt cylinder 30 (FIG. 2).

Tilt cylinder 30 is connected to circle frame 28 and tilt frame 40, such that actuation of tilt cylinder 30 changes the pitch of tilt frame 40 (and thus the moldboard 26) relative to circle frame 28. As best seen in FIG. 2, left and right blade-lift cylinders 34 are connected to saddle 36 (which in turn is fixed to articulation frame 14) and draft frame 22 such that actuation of cylinders 34 raises and lowers the sides of draft frame 22, and thus the moldboard 26, relative to articulation frame 14. A circle side-shift cylinder 35 is connected to the saddle 36 and the draft frame 22, such that actuation of cylinder 35 effects a side-shift of draft frame 22 and circle frame 28, and thus the moldboard 26, relative to the articulation frame 14. A moldboard side-shift cylinder 32 is connected to the tilt frame 40 and the moldboard 26, such that actuation of cylinder 32 laterally translates moldboard 26 relative to tilt frame 40 along a longitudinal axis of moldboard 26. A grader circle motor 38 is coupled to draft frame 22 and operates upon grader circle 24, such that actuation of motor 38 rotates grader circle 24. The moldboard 26 is coupled to the circle frame 28 through the tilt frame 40, and grader circle 24 is fixed to circle frame 28 such that moldboard 26 rotates with circle frame 28 relative to the draft frame 22.

In addition to the adjustable moldboard 26 described above, vehicle 10 may optionally be provided with a scarifier 42 and a ripper 44 (FIG. 1) for working the soil. As shown in FIG. 1, scarifier cylinder 43 is connected to scarifier 42 and draft frame 22 such that actuation of cylinder 43 raises and lowers scarifier 42. Ripper cylinders 45 are connected to ripper 44 and main frame 12 such that actuation of cylinders 45 raises, lowers, and operates ripper 44.

2. Front Wheel Functions Including Wheel-lean

As best shown in FIG. 2, the articulated frame 14 has two front auxiliary drive wheels, namely left front traction wheel 20 and a right front traction wheel 21. The front wheels 20, 21 may be propelled, steered, and leaned hydraulically as described in detail below, with the lean function of wheels 20, 21 automatically controllable by controller 310 as also described below.

Figure 5:
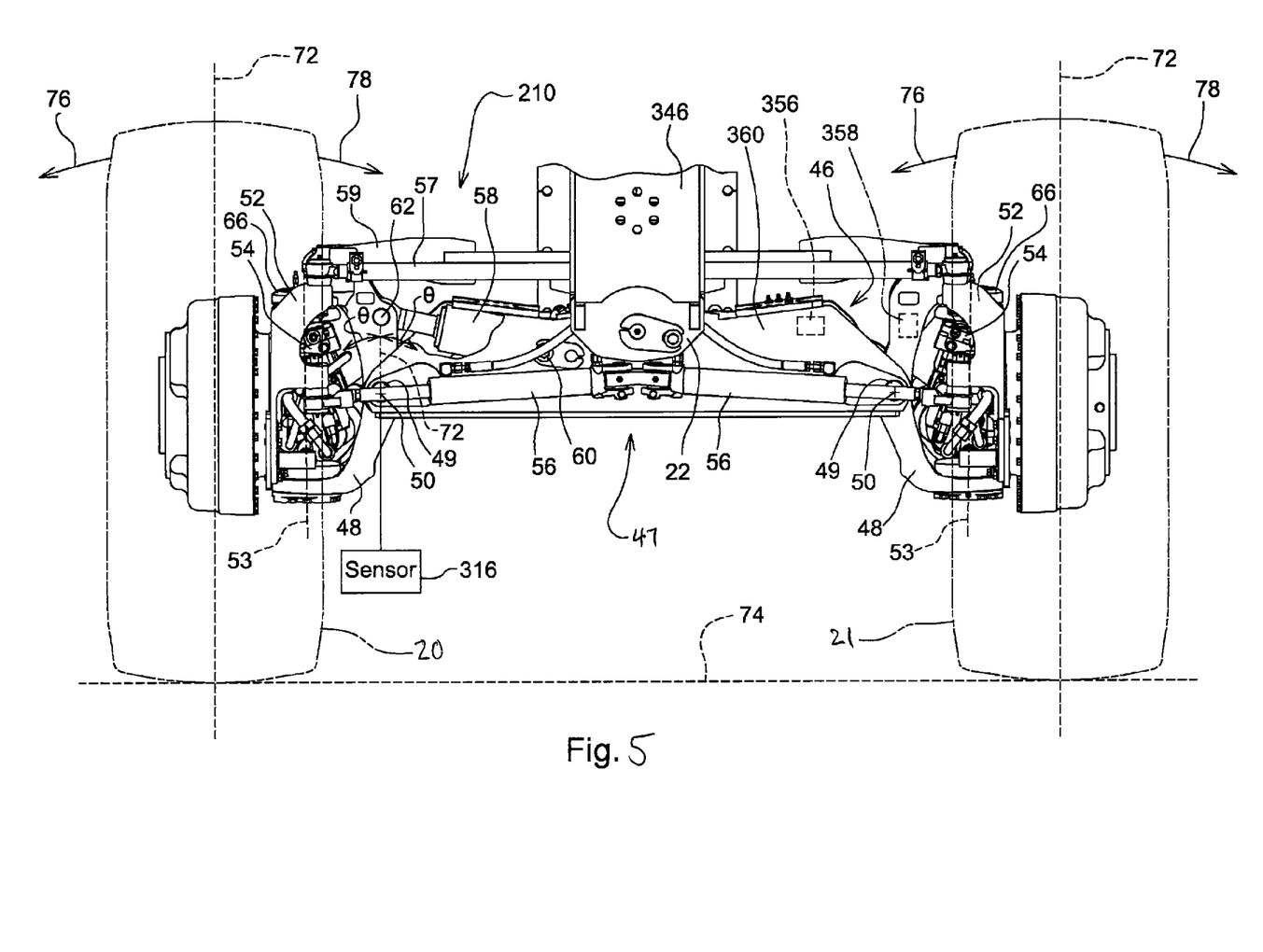
FIG. 5 is a rear elevation view of the front wheels of the motor grader shown in FIG. 1, with the front wheels shown at a neutral position.

Turning now to FIG. 5, the front wheels 20, 21 are coupled to the main frame 12 by use of a front wheel assembly 47. The front wheel assembly 47 includes a front axle 46, a center portion of which is rotatably coupled (e.g., pinned) to the main frame 12. At opposite ends of axle 46, a pair of yokes 48 are rotatably coupled to axle 46 by use of, for example, respective pins 49 such that yokes 48 can pivot with respect to axle 46 about longitudinal axes 50 of pins 49. The left and right yokes 48 are coupled pivotally to respective left and right spindles 52 by use of an upper kingpin and a lower kingpin, facilitating steering of the left and right wheels 20, 21 about respective wheel steering axes 53 defined by the kingpins. In this way, the upper and lower kingpins of spindles 52 provide left and right front wheel steering joints 66, which are illustrated diagrammatically in FIG. 9B and further described below. In the illustrative embodiment of FIG. 5, the left and right spindles 52 are fastened to left and right gear-reducing final drives, respectively, which are in turn fastened to the left and right front wheels 20, 21.

Hydraulic motors 54 are mounted to respective spindles 52 and operatively coupled to the final drive to provide motive force for forward and reverse rotation of the respective wheels 20, 21. Thus, the embodiment of vehicle 10 shown in the present figures has "dual-path hydrostatics" such that each of front wheels 20, 21 has associated with it a dedicated motor 54 and a dedicated pump (not shown).

The front wheel assembly 47 further includes right and left front steering cylinders 56 coupled at one end to axle 46 and at an opposite end to a respective spindle 52. Actuation of steering cylinders 56 rotates wheels 20, 21 about steering axis 53, such that wheels 20, 21 (and, therefore, articulated frame 12) are steered in a chosen direction. In order to maintain coordinated steering movement of wheels 20 and 21, tie rod 57 is connected to the left and right spindles 52.

Wheel-lean cylinder 58 is provided to selectively control the tilt, or lean, of front wheels 20, 21. For purposes of the present disclosure, "wheel-lean" refers to lateral movement of the top portion of wheels 20, 21 with respect to the bottom, ground-contacting portion thereof. Wheel-lean defines wheel-lean angle $\theta$, shown in FIGS. 3-4, and is referenced to a neutral position in which wheel-lean angle $\theta$ is zero, i.e., $\theta=0$ degrees. In the illustrated embodiment of FIG. 5, the neutral wheel angle gives rise to a wheel-symmetry line 72, which is a line separating wheels 20, 21 into substantially symmetrical halves as viewed in front elevation. In the illustrated embodiment of FIG. 3, wheel-symmetry line 72 extends from the point of contact between wheels 20 or 21 and support surface 74 to the top of wheels 20, 21. In general, wheel-symmetry line 72 is a line normal to surface 74 when wheel-lean angle $\theta$ is neutral and non-normal to surface 74 when wheel-lean angle $\theta$ is nonzero. Another alternative way to define wheel-lean angle $\theta$ in the context of wheel symmetry line 72 is to consider wheel angle $\theta$ equal to zero when the weight of vehicle 10 is spread evenly across the axial extent of the contact patch between wheels 20, 21 and an adjacent level support surface 74, with line 72 normal to support surface 74.

Each wheel 20, 21 is configured to lean laterally (left and right) from neutral as indicated in FIG. 5 by left arrows 76 and right arrows 78. In one example embodiment, wheel-lean angle $\theta$ for each of wheels 20, 21 may be as large as 20 degrees to the left of neutral along direction 76, and as large as 20 degrees to the right of neutral along direction 78.

Wheels 20, 21 are configured to lean together relative to their respective neutral positions. Referring to FIG. 5, hydraulic wheel-lean cylinder 58 is rotatably coupled to front axle 46 via pin 60, and to the left yoke 48 via pin 62. Front wheels 20, 21 are connected to one another via a wheel-lean bar 59, which is coupled pivotally to the upper portion of left yoke 48 and to the upper portion of right yoke 48 so as to extend between the yokes 48. Extension or retraction of the wheel-lean cylinder 58 simultaneously pivots the left and right yokes 48 about the respective longitudinal axes 50 of mounting pins 49 (described above), which in turn causes wheel-lean angle $\theta$ of the front wheels 20, 21 to change. In this way, front wheels 20, 21 are coupled to the axle 46 such that wheels 20, 21 can lean or tilt relative thereto to thereby selectively define a wheel-lean angle θ within a range of possible wheel-lean angles, depending upon the extended/retracted status of wheel-lean cylinder 58.

In some embodiments, vehicle 10 may be set up such that front wheels 20, 21 have a positive camber at neutral. In the present instance, positive camber refers to a situation in which wheel-symmetry lines 72 running though wheels 20, 21 converge as lines 72 extend away from support surface 74, and diverge toward support surface 74. For example, each wheel-symmetry line 72 may form a slight angle with true vertical (e.g., 0.21 degrees) in order, for example, to urge vehicle 10 to travel a straight path in the absence of a contrary steering effort. Moreover, a desired degree of camber can be selected by choosing a wheel-lean bar 59 (FIG. 5) with a desired length. Where such a camber is employed, neutral is taken to be the position at which the cumulative deviation of lines 72 from true vertical (e.g., from normal to surface 74) is minimized.

The aforementioned structure of wheel assembly 47 used to lean the front wheels 20, 21 is included in an example wheel-lean actuator system 210. Other components of the actuator 210 are discussed below in connection with the hydraulic system of vehicle 10, shown schematically in FIG. 6.

3. Hydraulic System

Figure 6:
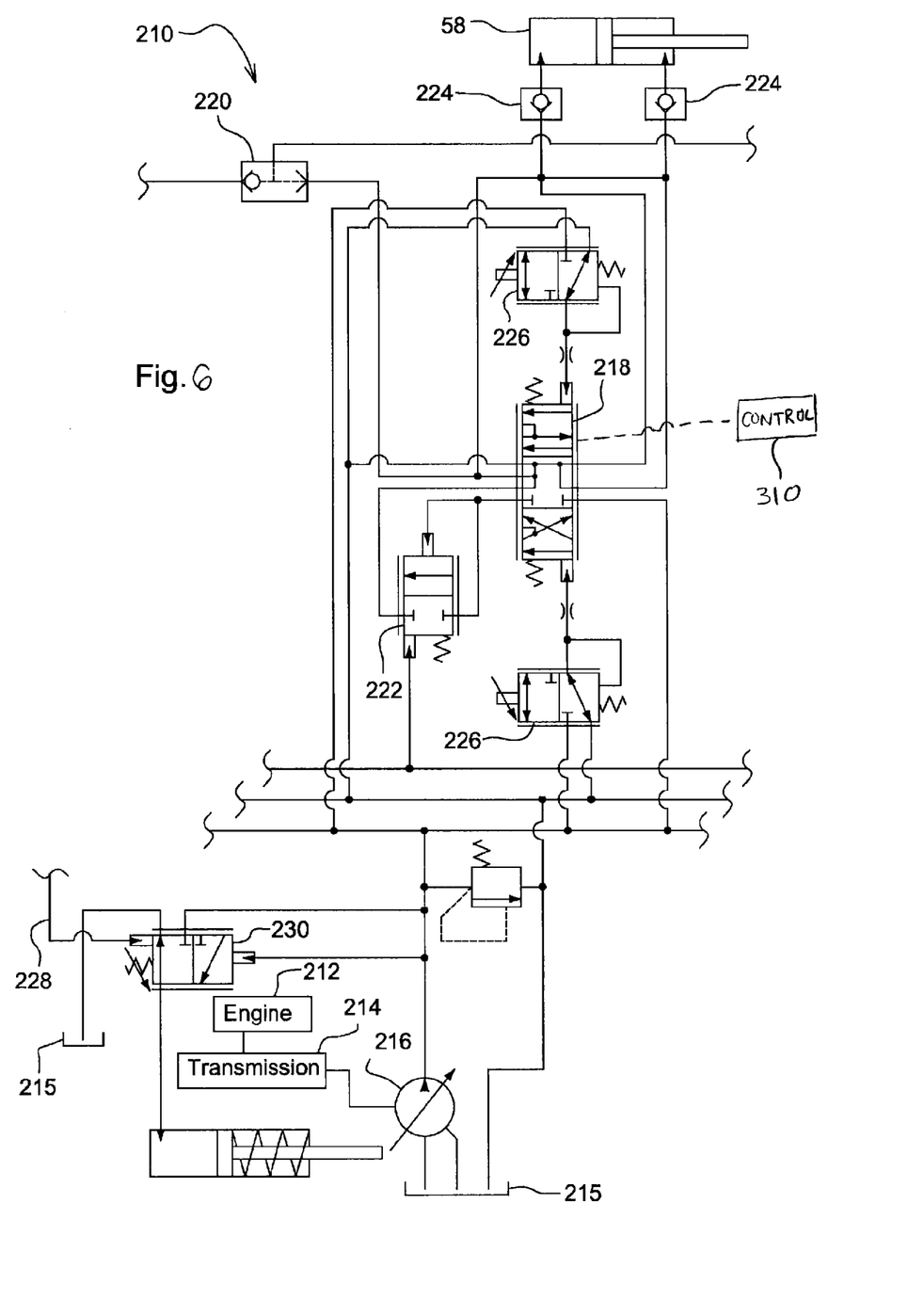
FIG. 6 is a schematic diagram of an example hydraulic system for a wheel-lean system of the motor grader of FIG. 1.

Turning now to FIG. 6, the wheel-lean actuator system 210 facilitates selectively leaning of front wheels 20, 21, relative to a neutral position, by actuation of wheel-lean cylinder 58. Wheel-lean actuator 210 includes components of the hydraulic system of the vehicle 10 which contribute to the present described wheel-lean functionality, as further detailed below.

Vehicle 10 has a hydraulic system that may serve several hydraulic functions of the vehicle 10, including the wheel-lean function. In the illustrated embodiment, for example, the hydraulic system is configured as a pressure-compensated, load-sense hydraulic system powered by the internal combustion engine 212 of the vehicle 10 (e.g., diesel engine) via a transmission 214 (or gearbox). Example hydraulic systems are described in U.S. Pat. No. 7,866,150, filed Aug. 26, 2008 and entitled Load Sense Boost Device, the entire disclosure of which is hereby expressly incorporated herein by reference. In the illustrated embodiment, the hydraulic system includes a pump 216 so powered, though it is contemplated that the pump 216 may be driven by an electric motor or other power source, such as one that may be powered by an electric generator driven by engine 212.

Pump 216 is configured, for example, as a variable displacement, axial piston pump (e.g., displacement up to 90 cubic centimeters) that may be gravity-fed with hydraulic fluid (e.g., hydraulic oil) from a tank or reservoir 215 which may also supply pressurized hydraulic fluid for several hydraulic functions of the vehicle 10, including the wheel-lean function described herein. As such, pump 216 is considered part of actuator 210.

The actuator 210 includes a wheel-lean section in a valve bank of the vehicle 10. The wheel-lean section includes a proportional directional control valve 218, a load-sense shuttle check valve 220, a compensator valve 222, a pair of lock-out valves 224, and a pair of proportional electro-hydraulic pilot valves 226. The control valve 218 has a spool configured to move between a closed-center neutral position and opposite extreme positions to direct flow of hydraulic fluid to and from the opposed head and rod work ports of wheel-lean cylinder 58. Pilot valves 226 are coupled fluidly respectively to opposite pilot ports of the control valve 218, as shown, and are responsive to control signals from control unit 310 (shown in FIG. 7 and further described below) to pilot the control valve 218. Alternatively, an on/off poppet valve could be used in place of the directional control valve 218 and the pilot valves 226. In another alternative, an electric linear actuator could be used in place of hydraulic cylinder 58.

The shuttle check valve 220 is one of a series of shuttle check valves associated respectively with various hydraulic functions. Each such shuttle check valve compares two pressures (e.g., two work port pressures associated with different hydraulic functions, or one such work port pressure and the other tank) so as to select the highest pressure among the functions, this pressure being provided as such or in representative form (e.g., pressure reduced across fixed orifice) as the load-sense pressure via a load-sense line 228 to a proportional valve 230 configured to establish a predetermined load-sense margin (e.g., 420 psi).

The normally closed compensator valve 222 has a pilot port coupled fluidly to the control valve 218 to receive pressure therefrom as the control valve 218 opens and an opposite pilot port coupled fluidly to the load-sense pressure and corresponding pilot ports of the compensator valves associated with other hydraulic functions. Collectively, the compensator valves divide flow so that all actuated hydraulic functions receive hydraulic fluid when multiple directional control valves are actuated.

The lock-out valves 224 trap the hydraulic fluid in respective fluid chambers of cylinder 58 so that cylinder 58 does not move until the control valve 218 is actuated. The lock-out valves 224 open in response to opening of the control valve 218, thereby allowing movement of the cylinder 58. As described in further detail below, control valve 218 is operably connected to control unit 310, such that instructions from control unit 310 act to selectively open control valve 218 for either extension or retraction of cylinder 58.

4. Control System for Wheel-lean

Figure 4:
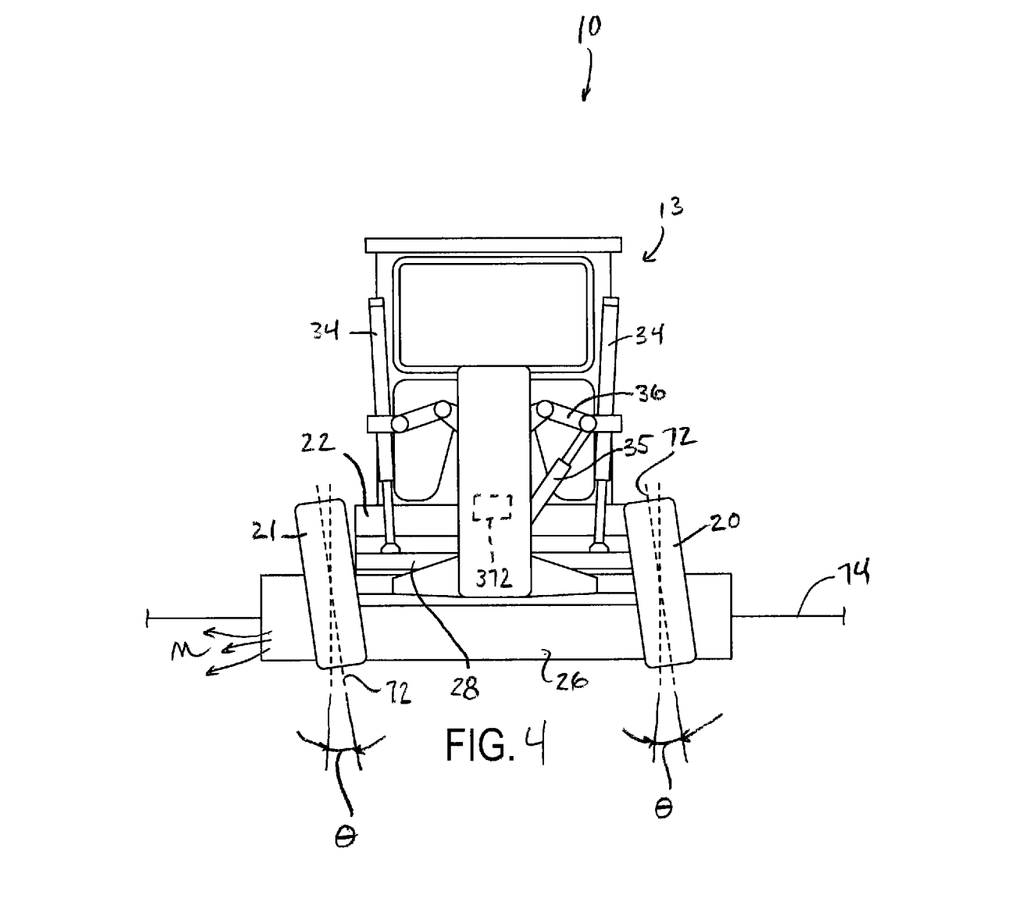
FIG. 4 is a front perspective view of the motor grader shown in FIG. 1, shown on a level ground surface and moving earthen material with the front wheels exhibiting wheel-lean.

Referring to FIG. 4, there is shown a simplified example control unit 310 for vehicle 10. Control unit 310 may include one or more electronic controllers. Exemplarily, the control unit 310 includes a network of such controllers connected via CAN ("Controller Area Network"). In other embodiments, the control unit 310 may include a single electronic controller.

Each electronic controller of control unit 310 includes sufficient processing power and memory to perform the various activities of the controller, as further described below. For example, each controller may include a processor (e.g., microprocessor) and memory coupled electrically to the processor, the memory unit having stored therein instructions which, when executed by the processor, cause the processor unit to perform the various activities of the controller.

Control unit 310 is operably coupled (e.g., electrically) to a wheel-lean angle sensor 316 (FIG. 5), a wheel-lean activation control 318, and wheel-lean actuator 210 (e.g., via control valve 218 as set forth above). Wheel-lean angle sensor 316 is positioned to sense an indication of wheel-lean angle θ at a given moment, and to emit a signal indicative of such indication. The setpoint activation control 318 is operable by the operator to request that the present wheel-lean angle of the front wheels 20, 21 assume a wheel-lean angle setpoint. The setpoint may be a zero wheel-lean angle (i.e., θ=0 degrees relative to neutral). Non-zero wheel-lean angles can also be selected, if desired. For example, a suitable non-zero wheel-lean angle may be selected based on the particular job to be performed by the vehicle 10, such as, for example, ditching or road maintenance.

Control unit 310 is configured to perform feedback control of the present wheel-lean angle θ causing wheel-lean actuator 210 to lean wheels 20, 21 automatically such that wheel-lean angle θ assumes a desired nominal value in response to input from wheel-lean control unit 334. As described further below, this nominal setpoint may be calculated based on a setpoint (using setpoint activation control 318), manual control (using wheel-lean controls 336) or automatically set based on one or more external factors (using automatic activation control 364).

In an example embodiment, the control unit 310 has a plurality of electronic controllers. For example, the control unit 310 may include an advanced display unit controller (ADUC) 320, a hydraulic valve controller (HVC) 322, a flex load controller (FLC) 324, a wheel-lean controller (WLC) 326, and possibly other controllers. Such controllers may be coupled electrically to one another via, for example, a CAN bus 327.

Figure 8:
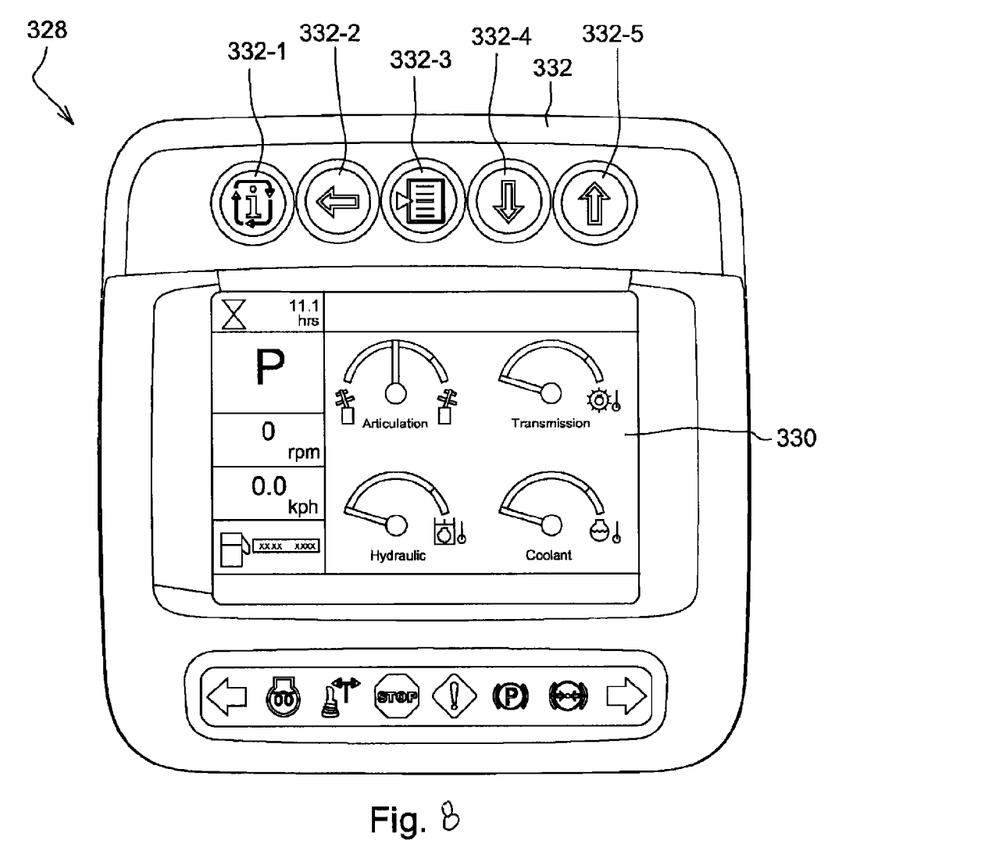
FIG. 8 is a front elevation view of a user interface useable with the motor grader of FIG. 1.

Referring to FIG. 8, the ADUC 320 is included in an advanced display unit 328. The unit 328 includes a display 330 (e.g., LCD color display) and an operator interface 332, and may be mounted in any suitable location in the operator's station 13, such as, for example atop the front steering console or to a post on the right side of the operator's station 13. The operator interface 332 is configured to receive the wheel-lean angle setpoint from the operator or from automatic wheel-lean calculator 376. The operator may use the operator interface 330 to input the wheel-lean angle setpoint into the control unit 310, or to activate automatic wheel-lean control. The setpoint and/or wheel-lean control algorithm is stored in the memory of the ADUC 320, and the ADUC 320 broadcasts a signal indicative of the current desired wheel-lean angle θ on the CAN bus 327. The signal is received by the HVC 322.

The operator interface 332 may have a number of push buttons mounted to the display 330. The push buttons may be aligned along the top of the display 330 and may include a screen swap button 332-1, a back button 332-2, a menu/select button 332-3, a down button 332-4, and an up button 332-5, each of which may be back-lit. The screen swap button may toggle the screen of the display 330 between a number of screens, such as, for example, a gauge screen, a rearview camera screen, and an embedded cross slope system screen. In the gauge screen, the display 330 may display, for example, analog-looking temperature (transmission, hydraulic, and engine coolant) and articulation gauges, gear selection, engine speed, ground speed, fuel level, hours of operation, ambient temperature, odometer, and the like. The menu/select button is used to go to the main menu, and allows selection of a highlighted menu item or store a value set in the memory of the ADUC 320. The back button reverts to the previous screen when viewing a particular menu. The down button highlights the next item in a menu or decreases a value being stored. The up button highlights the previous item in a menu or increases a value being stored. It is understood that a wide variety of operator interfaces could be used.

The wheel-lean angle sensor 316 is positioned to sense the present wheel-lean angle of the front wheels 20, 21. The location of the sensor 316 may be selected to afford suitable protection to the sensor 316 (including its wiring), if any, against external elements (brush, snow, ice, etc.).

In an example, the sensor 316 may be configured as a rotary sensor, in the form of a rotary encoder, mounted to sense an angle of rotation of a yoke 48 relative to either the axle 46 or the wheel-lean cylinder 58, such angle being indicative of the present wheel-lean angle. In an example, although both yoke pivot pins 49 are shown fixed to the axle 46 against movement relative thereto, a yoke pivot pin 49 (left or right) may be inserted into the axle 46 through the respective yoke 48 and fixed to the yoke 48 against movement relative thereto (e.g., with a cross bolt through the yoke 48 and the pin 49 and a nut holding the bolt in place), and the rotary sensor may mounted to the end of the pin 49 and to the axle 46 to sense relative rotation between the yoke 48 and the axle 46 (such as to the rearward end of the pin 49 and the rearward plate of the axle 46) (both pivot pins 49 may be so fixed respectively to the yokes 48). In another example, the rotary sensor may be mounted between a yoke 48 (left or right) and the respective yoke pivot pin 49 fixed to the axle 46 to sense relative motion therebetween. In such a case, the rotary sensor may be mounted at the yoke pivot pin 49 such that the sensor is integrated into the pin 49, or sufficient space may be created for mounting of the sensor at the pin 49 between the pin 49 and the yoke 48. In another example, such a sensor may be mounted between the rod end of the cylinder 58 and the left pin 62.

In another example, the sensor 316 may be configured, for example, as a linear displacement sensor (e.g., linear potentiometer) mounted to the wheel-lean cylinder 58 to sense the stroke of the cylinder, such stroke being indicative of the present wheel-lean angle θ. The linear displacement sensor 316 may be mounted internally for protection of the sensor. Alternatively, the linear displacement sensor 316 may be mounted externally to the cylinder 58.

In yet another example, the sensor 316 may be configured as a pair of inclinometers. The first inclinometer 356, shown diagrammatically in FIG. 5, may be mounted to the front axle 46 to sense a first angle of inclination $\epsilon$ relative to gravity, and the second inclinometer 358, shown diagrammatically in FIG. 5, may be mounted to one of the yokes 48 (e.g., the right yoke 48 below a mechanical stop) to sense a second angle of inclination $\zeta$ relative to gravity, wherein $\zeta$-$\epsilon$ is indicative of the present wheel-lean angle θ. The axle 46 may have a front plate and a rear plate 360 defining a space therebetween. The first inclinometer 356 may be mounted in the space within the axle 46 on the front vertical surface of the rear plate 360 for protection of the inclinometer 356 and its wiring.

The wheel-lean angle sensor 316 may be coupled electrically directly to the FLC 324 (or a different controller such as, for example, the HVC 322). In the case of a linear displacement sensor or a rotary sensor as the sensor 316, the sensor 316 generates a wheel-lean angle signal indicative of the present wheel-lean angle θ sensed by the sensor 316. The FLC 324 receives this signal and broadcasts on the CAN bus 327 a signal (itself a present wheel-lean angle signal) indicative of the present wheel-lean angle. The HVC 322 receives this signal.

In the case of a pair of inclinometers as the sensor 316, the first inclinometer generates a signal indicative of the first angle of inclination $\beta$, and the second inclinometer generates a signal indicative of the second angle of inclination $\gamma$. The FLC 324 receives those signals, and calculates a difference between them, i.e., $\gamma$-$\beta$, such difference being indicative of the present wheel-lean angle θ. Based on this calculation, the FLC 324 broadcasts on the CAN bus 327 a signal (itself a present wheel-lean angle signal) indicative of the present wheel-lean angle θ. The HVC 322 receives this signal.

Wheel-lean angle θ as measured by sensor 316 is used for comparisons between desired and present wheel-lean angles θ in both the automatic and setpoint wheel-lean control modalities, described in detail below. The HVC 322 (FIG. 7) receives an indication of the present wheel-lean angle θ, and receives an indication of the desired wheel-lean angle θ in accordance with the automatic or setpoint wheel-lean control modalities. HVC 322 then determines which direction wheels 20, 21 must be moved to move wheels 20, 21 from the present wheel-lean angle θ to the desired wheel-lean angle θ. From this information, the HVC 322 determines which pilot valve 226 to activate.

The HVC 322 is coupled electrically to the two pilot valves 226, and outputs the control signal (e.g., a current) to the appropriate pilot valve 226. The HVC 322 outputs the control signal to a first of the pilot valves 226 to move wheels 20, 21 in a first direction (e.g., tops to the left) and outputs the control signal to a second of the pilot valves 226 to move wheels 20, 21 in a second, opposing direction (e.g., tops to the right). The HVC 322 ceases outputting the control signal when the present wheel-lean angle θ substantially equals the computed wheel-lean angle θ set by calculator 376. In one embodiment, "substantially equals" may mean within plus-or-minus 0.25 degrees, for example.

The control unit 310 may be configured in a wide variety of ways. It may have a single controller, or two or more controllers. In the case of two or more controllers, specific controller inputs, outputs, and responsibilities may be assigned in a wide variety of ways, the arrangement disclosed herein being one such possible way.

a. Automatic Wheel-lean Control

Figure 7:
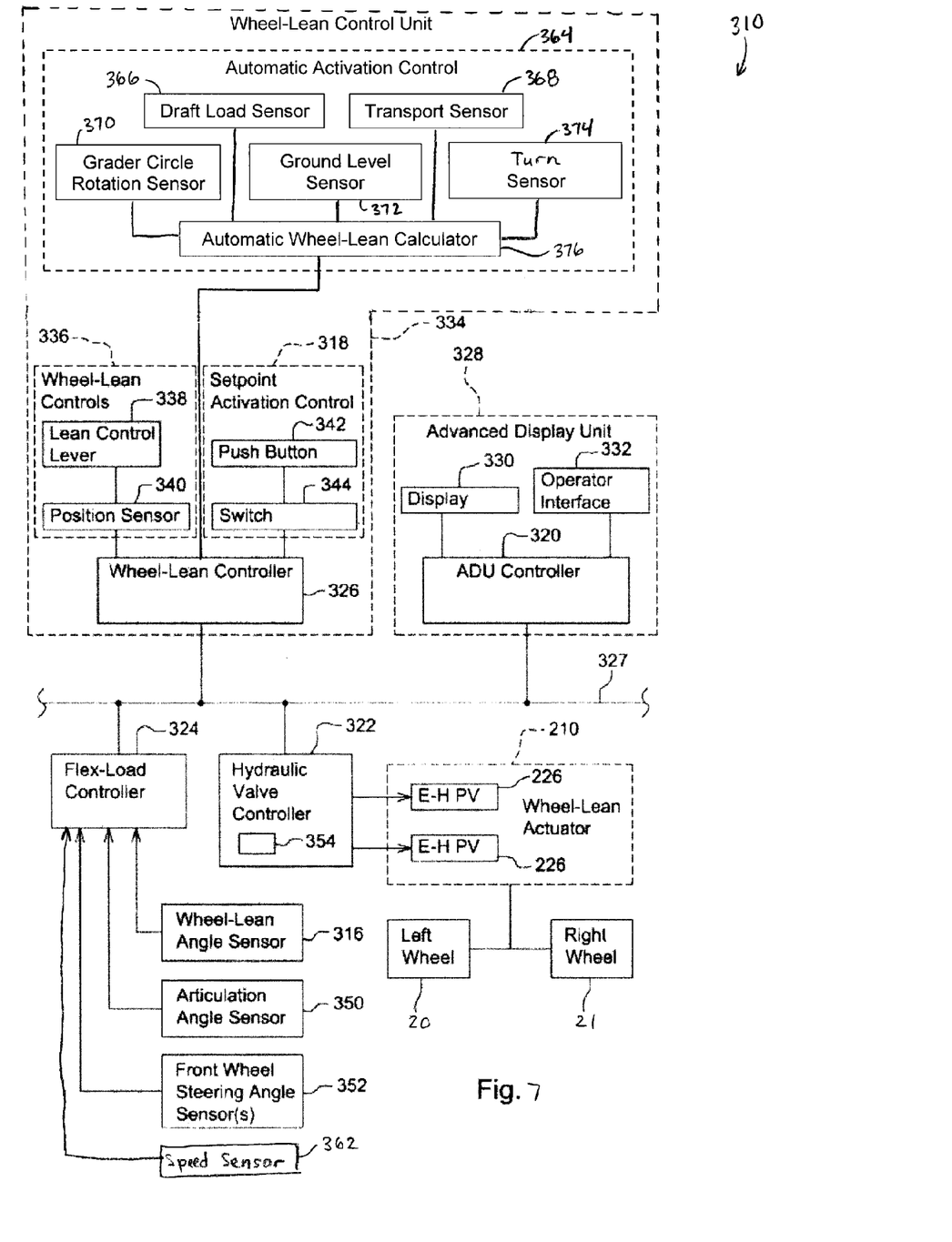
FIG. 7 is a schematic diagram of an example control system for a wheel-lean system of the motor grader of FIG. 1.

As shown in FIG. 7, control unit 310 includes automatic activation control (AAC) 364 including one or more sensors which transmit signals to automatic wheel-lean calculator 376. Calculator 376 then outputs a desired wheel-lean angle θ to wheel-lean controller 326, which includes a comparator to compare the desired wheel-lean angle θ to the actual present wheel-lean angle θ measured by wheel-lean angle sensor 316. If this comparison results in a disparity between the desired and actual lean angles θ of threshold magnitude, then controller 326 adjusts the actual wheel-lean angle θ to substantially equal the desired wheel-lean angle as set forth in further detail below. This threshold disparity may be set at any level appropriate to ensure responsiveness and stability of the automatic wheel-lean function. For example, the threshold disparity may be as little as zero degrees, 0.25 degrees or 0.5 degrees, or as much as 1 degree, 2 degrees or 3 degrees, or may be any value within any range defined by any of the foregoing values.

When the threshold disparity between actual and desired wheel-lean angles θ is reached, controller 326 transmits move signals to one or more of controllers 210, 322 and 324 to selectively tilt or lean wheels 20, 21 into the desired configuration. In an example embodiment, control unit 310 uses a "closed loop" control modality (e.g., feedback control) in which controller 326 continuously monitors signal outputs from AAC 364, such that wheel-lean angle θ is continuously updated to reflect changes in the surrounding environment as measured by the one or more sensors operatively connected to automatic wheel-lean calculator 376. In one embodiment, such continuous updating may be conducted at a sample rate of about one per second, so as to avoid unstable adjustment of wheel-lean angle θ. In other embodiments, the sample rate may be faster or slower as appropriate for a particular application, or may be continuous (e.g., analog). In addition, controller 310 may prevent any adjustment of wheel-lean angle θ until a threshold minimum computed adjustment is calculated, such as at least 0.25 degrees.

In an alternative embodiment, wheel-lean controller 326 may omit the comparator discussed above, instead utilizing an "open loop" control modality for actuating controllers 210, 322 and/or 324. For example, wheel-lean calculator 376 may, after receiving signals from AAC 364 indicative of a need for wheel-lean, simply output a signal directly to controllers 210, 322 and/or 324 which cause such wheel-lean to be effected for a set amount of time (e.g., 3 seconds). The amount of time of actuation may be variable depending on the nature of the signal, with signals indicative of a need for a larger wheel-lean resulting in a longer actuation and vice versa.

The sensor or sensors of AAC 364 provide inputs to calculator 376 that are indicative of environmental conditions and/or vehicle parameters. As these conditions and parameters change in the fluid environment of vehicle operation, the signals provided by the sensor or sensors change and facilitate continuous updating of the output from calculator 376. In one embodiment, a vehicle parameter used to set wheel-lean angle θ is a measurement or inference of draft load forces on vehicle 10. For example, where moldboard 26 is configured to move earthen material to the right, a rightward-facing force vector arises and vice-versa. The magnitude of this rightward-oriented force vector increases as the amount of earthen material displaced increases, and as the rate of acceleration of the material increases (i.e., from stationary to moving as moldboard 26 displaces the material). Of course, this rightward-oriented force gives rise to leftward-oriented reaction force vectors of equal magnitude. This leftward-oriented force vector is borne by vehicle 10, and wheels 20, 21 may assist with this as described further below.

As illustrated in FIG. 4, where earthen material M is being moved or displaced in a rightward direction, left and right front wheels 20 and 21 may be angled so that the tops of wheels 20, 21 are displaced to the right from the neutral position. Stated another way, the tops of wheels 20, 21 are displaced to the right as compared to the contact patches of the tires of wheels 20, 21 in contact with support surface 74. The nominal value of wheel-lean angle θ may be programmed to increase as the draft load forces increase. Thus, where an increase occurs in quantity or density of earthen material M being displaced by moldboard 26, a corresponding increase in draft load forces will be experienced by vehicle 10 and wheel-lean angle θ may be increased accordingly. As wheel-lean angle θ increases, the wheels "bite" into the adjacent support surface 74 more forcefully which acts to offset the draft load forces on vehicle 10. This offsetting negates the tendency of vehicle 10 to move in the opposite direction of material M, thereby maintaining the trajectory of vehicle 10 along the desired path.

Sensing of the draft load forces may be accomplished in a number of ways. In one embodiment, draft load sensor 366 takes the form of a torque measurement device operably connected to grader circle 24, such that the amount of torque transmitted to grader circle 24 by forces applied to moldboard 26 is measured and transmitted to automatic wheel-lean calculator 376. Once this torque is known, calculator 376 may be programmed with a mathematic formula or algorithm appropriate to the particular geometry of vehicle 10, such that the result of the calculation approximates the amount of lateral force exerted on moldboard 26 (which urges vehicle 10 to the left or right as noted above).

This calculated lateral force may then be compared to a schedule of counteracting lateral forces available by adjustment of wheel-lean angle θ of wheels 20 and 21. This schedule of counteracting forces can be expected to vary across vehicles of different size, weight and geometry, and the particular nominal values for any given vehicle may therefore be empirically determined by testing on that vehicle. Based on a comparison between the calculated actual force being presently exerted upon moldboard 26 and the force compensation available by wheel-lean angle θ, calculator 376 selects a wheel-lean angle θ that provides the closest possible match to the calculated force. Calculator 376 then outputs the desired wheel-lean angle θ to wheel-lean controller 326, which in turn effects the desired change in wheel-lean angle θ in the manner described herein.

An alternative system method for sensing the draft load on vehicle 10 is to place a strain gauge sensor on draft frame 22, such that material deformation within frame 22 arising from forces exerted on moldboard 26 can be measured. As draft forces on moldboard 26 increase, material deformation in draft frame 22 can be expected to increase, and the mathematical relationship between strain and force can be empirically derived or mathematically approximated. While draft frame 22 is used as an example component for this strain measurement, it is contemplated that any other component of vehicle 10 which experiences forces proportional to the draft load may also be used, such as circle frame 28 or tilt frame 40. In a similar fashion to the method above using a circle torque sensor, using a strain gauge sensor in this manner for draft load sensor 366 can approximate the amount of draft force applied to moldboard 26, and wheel-lean angle θ may be continuously set at an appropriate nominal value to counteract this approximated force.

Still another system and method for sensing the draft load on vehicle 10 is through the use of a pressure transducer operably connected to tilt cylinder 30, moldboard side-shift cylinder 32, blade-lift cylinders 34 and/or side-shift cylinder 35 (FIG. 2). Each of cylinders 30, 32, 34 and 35 are subject to a force when a draft load is placed upon vehicle 10 (e.g., as a result of the movement of material M as shown in FIG. 4), and provides firm support to one or more respective parts of vehicle 10 to avoid movement of such parts when such a force is encountered. In providing this support, a pressure is experienced within cylinders 30, 32, 34 and/or 35. Measurement of this pressure can be extrapolated to produce a total overall draft load on vehicle 10 by comparing the measured pressure with empirically determined tables or mathematical relationships which correlate the measured pressure to an overall draft load.

Figure 3:
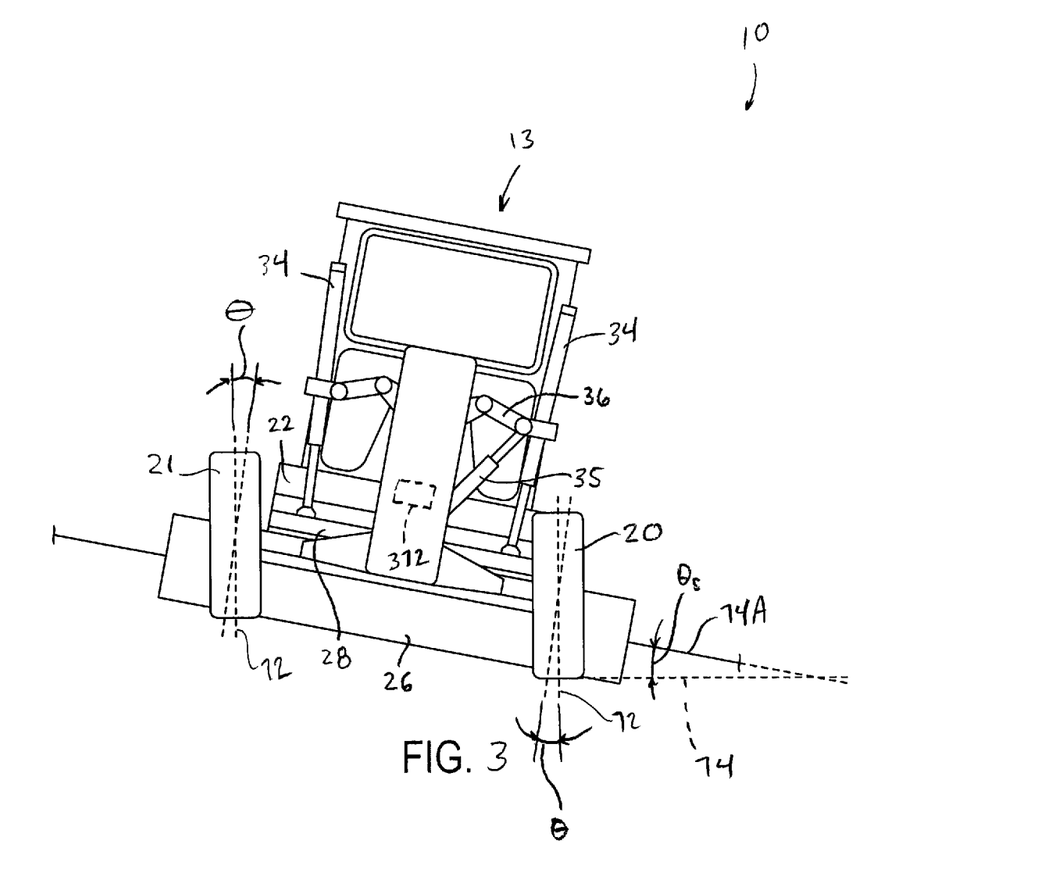
FIG. 3 is a front perspective view of the motor grader shown in FIG. 1, shown on a sloped ground surface with the front wheels exhibiting wheel-lean.

Turning now to FIG. 3, operation of vehicle on a sloped surface 74A can also lead to a tendency for vehicle 10 to drift down slope. In order to counteract this tendency, wheel-lean angle θ may be automatically adjusted to compensate for the steepness of sloped surface 74A with respect to level surface 74 (i.e., the magnitude of angle $θ_S$ shown in FIG. 3). In this instance, ground level sensor 372 may be included as part of AAC 364 to measure the steepness of sloped support surface 74A and the associated vehicle parameter of vehicle 10, namely vehicle inclination. In particular, ground level sensor 372 measures the angle at which vehicle 10 is presently inclined along a transverse plane, which is the plane extending along a direction perpendicular to longitudinal axis A of vehicle 10 (FIG. 1) and parallel to the support surface upon which vehicle 10 is supported.

In one example embodiment, ground level sensor 372 is an inclinometer which generates a signal indicative of slope angle $θ_S$ with respect to a gravitationally horizontal orientation. This signal is received by automatic wheel-lean calculator 376, which uses a predetermined mathematical formulation or algorithm to set wheel-lean angle θ based on the nominal value of slope angle $θ_S$. Alternatively, calculator 376 may use a comparison of the measured slope angle $θ_S$ to a schedule of nominal values to set wheel-lean angle θ, in similar fashion as the comparison used for draft load as discussed above. In one example embodiment, shown in FIG. 3, wheel-lean angle θ may be set equal to slope angle $θ_S$ such that left and right wheels 20, 21 are maintained in a gravitationally upright position. In other alternative embodiments, θ may be set at a nominal value greater than slope angle $θ_S$, either by a fixed nominal amount or by a fixed multiple of $θ_S$. Under most circumstances, the direction of wheel-lean angle θ is such that wheel symmetry line 72 is brought closer to perpendicularity with a hypothetical level ground surface 74, i.e., wheels 20 and 21 are made more "upright" with respect to gravity.

Yet another option for automatically adjusting wheel-lean angle θ may be based on the relative rotational position of grader circle 24 (and therefore of moldboard 26). More particularly, grader circle rotation sensor 370 (FIG. 7) may measure the rotational position of grader circle 24 and moldboard 26, and may output a signal indicative of the measured rotational position to automatic wheel-lean calculator 376. To determine direction of wheel-lean, if the signal emitted by rotation sensor 370 indicates that moldboard 326 is in a rightwardly facing orientation (i.e., is oriented to move earthen material M to the right as shown in FIG. 4), wheels 20, 21 are rotated such that the tops of wheels 20, 21 move to the right as shown in FIG. 4. Moreover, the amount of such wheel rotation may be varied depending on the amount of reaction forces borne by vehicle 10 inferred by rotation sensor 370. Where sensor 370 indicates that moldboard 26 is rotated to face "hard right" (e.g., 45 degrees), for example, it can be inferred that a greater volume of material M is displaced by vehicle 10 than if moldboard 26 has a lesser rotation. This increase in displaced volume gives rise to a corresponding increase in action/reaction force vectors (as noted above), and rotation of wheels 20, 21 may be increased to aid in generating the needed reaction force.

Sensing the rotational position of moldboard 26 may therefore be considered as a proxy for draft load on vehicle 10 (in addition to, or instead of the measurement of forces described above). In view of the correspondence between rightward rotation of moldboard 26 and the associated lateral (i.e., rightward or leftward-oriented) reaction forces, nominal wheel-lean angle θ may be also be set automatically on the basis of the inferred force. Thus, for purposes of the present application, a sensor measuring only the rotational position of moldboard 26 can be said to measure a vehicle parameter indicative of draft load and may therefore be considered a "draft load sensor" in accordance with the present disclosure.

Using this inference, calculator 376 may be programmed to set the nominal value of wheel-lean angle θ in direct correlation to the level of rotation of grader circle 24 away from a centered position (i.e., a position in which moldboard faces straight ahead, such that the transverse extent of moldboard 26 is substantially perpendicular to longitudinal axis A of vehicle 10). In one example embodiment, this may be a linear correlation, i.e., steady increase in rotational position of grader circle 24 results in a correspondingly steady increase in the magnitude of wheel-lean angle θ. Similarly, a leftward orientation of grader circle 24 and moldboard 26 causes a leftward shift in the tops of wheels 20, 21 from neutral, with the nominal value of wheel-lean angle θ increasing as moldboard 26 is rotated further leftward.

The circle rotation sensor 370 may take the form of an encoder operably engaged with grader circle 24, an optical sensor adapted to read visual cues imprinted upon grader circle 24, a signal transmitted directly from circle motor 38 and indicative of motor mandrel position (e.g., motor 38 may be a servo motor), or any other suitable sensing technology.

Yet another input to automatic wheel-lean calculator 376 may be emitted from turn sensor 374. In one example embodiment, turn sensor 374 may accept signals from articulation angle sensor 350 and/or front wheels steering sensor 352 (FIG. 7). Where articulation angle β (FIG. 9A) is increasingly acute, and/or steering angle α is also acute, then automatic wheel-lean calculator 376 may infer that a "tight" turn is being executed by the operator of vehicle 10, and may automatically set wheel-lean angle θ accordingly.

The steering angle α may be determined based on one or both of the articulation angle β of the vehicle 10 and a front wheel steering angle γ. Preferably, the steering angle α is just the front wheel steering angle. Alternatively, it may be just the articulation angle, or a combination of the articulation angle β and the front wheel steering angle γ (i.e., α=β+γ).

Figure 9A:
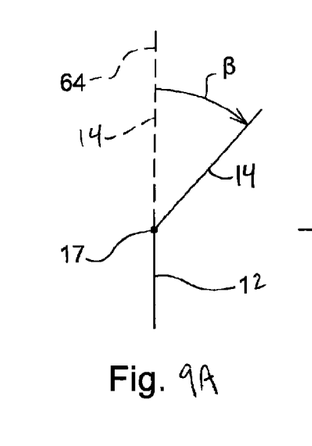
FIG. 9A is a diagrammatic view showing an articulation angle of the motor grader of FIG. 1.

Referring to FIG. 9A, an articulation angle sensor 350 coupled electrically to the FLC 324 may sense articulation angle β. The articulation angle β may be defined as the angle of articulation of the articulated frame 14 relative to the main frame 12 (or vice versa) from the straight and aligned orientation 64 of the frames 12, 14. The articulation angle sensor 350 may be a rotary encoder positioned at articulation joint 17 (FIG. 2) to sense articulation angle β and convert angle β into a signal (e.g., a nominal voltage value) indicative of articulation angle β. The FLC 324 may receive that signal, and determine the articulation angle using a schedule or look-up table stored in memory of the FLC 324, interpolating as needed. The schedule may be calibrated with nominal signal values and corresponding articulation angles β at the zero position (straight orientation 64), the full left articulation position, and the full right articulation position (which assumes a linear relationship between zero and full articulation). An equation or other suitable methods may be used instead of a look-up table to determine the articulation angle β.

Figure 9B:
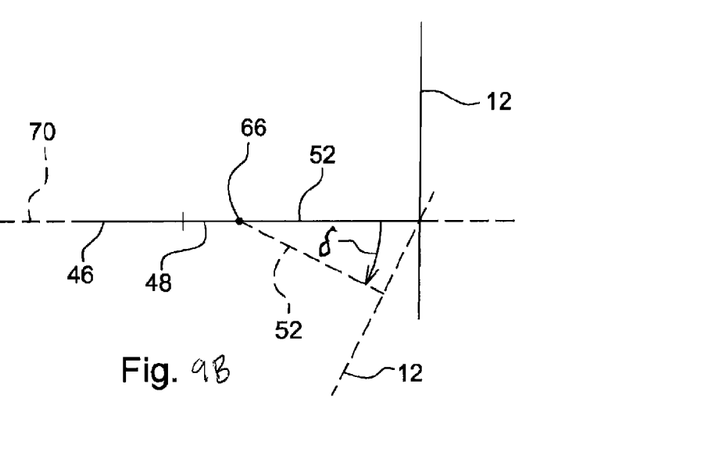
FIG. 9B is a diagrammatic view showing a front wheel steering angle of the motor grader of FIG. 1.

Referring to FIG. 9B, the front wheel steering angle γ may be determined in a number of ways. For example, a single front wheel steering angle sensor 352 coupled electrically to the FLC 324 may be positioned next to a first of the front wheels 20, 21 (left or right, illustratively the right) at the steering joint 66 of a respective wheel 20 or 21 to sense the steering angle δ of that wheel 20 or 21. The front wheel steering angle sensor 352 may be a rotary encoder positioned at either one of the two kingpins of the steering joint 66 of one of wheel 20 and 21, such as, for example, the upper kingpin, to sense the rotation of the kingpin, or, stated otherwise, the angular displacement of the spindle 52 relative to the yoke 48 from the position of the spindle 52 when the wheel 20 or 21 is perpendicular to an axis 70 of the axle 46. Such may be the angle sensed by the sensor 352. The sensor 352 may convert that angle into a signal (e.g., a nominal voltage).

Still another input to calculator 376 may be emitted by transport sensor 368. Transport sensor 368 determines whether vehicle 10 is in a transport mode, that is, whether vehicle 10 is in service to move the vehicle from one place to another at a relatively high speed, rather than to effect work upon earthen material M or another material at a relatively lower speed.

Control unit 310 is coupled to a speed sensor 362 (FIG. 7) positioned to sense an indication of the speed of vehicle 10. If the speed of vehicle 10 is at least a non-zero threshold speed, wheel-lean angle θ may be commanded to neutral. More particularly, control unit 310 may be configured to determine if this speed is at least a non-zero threshold speed, and, if so, output a control signal causing the wheel-lean actuator 210 to move the front wheels 20, 21 to neutral.

The threshold speed may be ground speed, such as, for example, a roading speed (e.g., 10 miles per hour). Speed sensor 362 may be a ground speed sensor positioned to sense an indication of a ground speed of vehicle 10. In an example, speed sensor 362 may be a transmission output shaft speed sensor positioned to sense the rotational speed of the output shaft of a transmission of operably interposed between engine 212 and wheels 18. In this example, the ground speed is calculated based on the output shaft speed, taking into account vehicle geometry downstream of the output shaft.

In another example, speed sensor 362 may be a tandem axle speed sensor positioned to sense the rotational speed of one of the two axles of tandems 25, the ground speed calculated based on that axle speed, taking into account vehicle geometry downstream of that axle (a no-turning condition in which the wheels 18 of the left and right tandems 25 are turning at equal rotational speeds may be assumed). Zero wheel slippage may also be assumed, in the case of a transmission output shaft speed sensor, a tandem axle speed sensor, or other speed sensor that senses ground speed indirectly.

In yet another example, speed sensor 362 may be a radar sensor configured to sense actual ground speed using radar (e.g., one that shoots the ground with radar). GPS speed tracking or other speed tracking systems using measurements of the surrounding environment may also be used for speed sensor 362.

The control unit 310 is thus configured to determine if the ground speed is at least the non-zero threshold speed, and, if so, output the control signal causing the wheel-lean actuator 210 to move the traction wheel to neutral.

The FLC 324 is coupled to the speed sensor 362 and receives from the speed sensor 362 a speed signal indicative of the ground speed of the vehicle 10. The FLC 324 broadcasts on the CAN bus 327 a signal (itself a speed signal) indicative of the speed. The HVC 322 receives this signal, and determines if the ground speed is at least the non-zero threshold speed stored in memory thereof, and, if so, outputs the control signal causing the wheel-lean actuator 210 to move the traction wheel to neutral.

As illustrated in FIG. 7, automatic wheel-lean calculator 376 may accept inputs from any combination of draft load sensor 366, transport sensor 368, grader circle rotation sensor 370, ground level sensor 372 and turn sensor 374. Each sensor signal, and its implications on a calculation of wheel-lean angle θ, may be given appropriate weight according to operator needs, environmental factors, and empirical observations as appropriate for any individual vehicle such as vehicle 10. Moreover, it is contemplated that advanced display unit 328 (FIG. 8) may be used to alter the mix of sensors whose signals are considered by calculator 376, and the respective weights and other effects of received signals upon the ultimate calculation of wheel-lean angle θ.

b. Setpoint Wheel-lean Control

An example system and method for implementing a user-defined setpoint as the controlling factor in setting wheel-lean angle θ is described in U.S. Pat. No. 8,412,420, filed Dec. 14, 2010 and entitled Wheel Lean Control, the entire disclosure of which is hereby expressly incorporated herein by reference.

In the setpoint modality, control unit 310 is configured to: store the wheel-lean angle setpoint, receive one or more signals indicative of the present wheel-lean angle in response to operation of the wheel-lean angle sensor 316 and a wheel-lean request signal indicative of a request that the present wheel-lean angle assume the wheel-lean angle setpoint in response to operation of the setpoint activation control 318, determine if the present wheel-lean angle is at the wheel-lean angle setpoint in response to the wheel-lean request signal, and, if not, output a control signal causing the wheel-lean actuator 210 to move the wheels 20, 21 such that the present wheel-lean angle assumes the wheel-lean angle setpoint. In this way, the front wheels 20, 21 can be moved automatically to the setpoint by simple operation of the control 318.

Various predetermined criteria may be used to determine if the present wheel-lean angle is "at" or "assumes" (or words to that effect) the wheel-lean angle setpoint. For example, the present wheel-lean angle is deemed to be "at" or to "assume" (or words to that effect) the wheel-lean angle setpoint if the present wheel-lean angle is within a predetermined tolerance about the wheel-lean angle setpoint (e.g., + or −0.25 degree from the setpoint).

The operator may input the wheel-lean angle setpoint using the ADU 328. For example, at the main menu, the operator may select a set-up menu screen (e.g., machine settings) with the menu/select button, and, at such menu screen, select wheel-lean angle with the menu/select button.

At the wheel-lean angle selection screen, the operator may use the up and down buttons to enter a wheel-lean angle. For example, the up and down buttons may be used to scroll between a number of setpoint options in order to highlight the setpoint desired. In another example, the up and down buttons may be used to increment and decrement a setpoint value until the desired setpoint is displayed. The increment/decrement interval may be 0.1 degree or greater, such as, for example, 0.5 degree.

Once the desired setpoint is entered, the operator may select that setpoint to be the wheel-lean angle setpoint by pressing the menu/select button, generating a setpoint signal indicative of that value. This signal is received by the ADUC 320, and may be stored therein. The ADUC 320 broadcasts a signal on the CAN bus 327 indicative of the wheel-lean angle setpoint. This signal is received by the HVC 322 which stores the wheel-lean angle setpoint in its memory. The wheel-lean angle setpoint may be displayed by the display 330 in, for example, a menu set-up screen of the display 330 (e.g., machine settings). In another example, the wheel-lean angle setpoint may appear on a different screen (e.g., on the gauge screen or other screen), such as if the setpoint is at neutral or full-travel left or right or anywhere in between.

The WLC 326 broadcasts a wheel-lean request signal indicative of the request that the present wheel-lean angle of the wheels 20, 21 assume automatically the wheel-lean angle setpoint, and the HVC 322 receives that signal. As such, in this example embodiment, both the WLC 326 and the HVC 322 receive a wheel-lean request signal indicative of a request that the present wheel-lean angle of the wheels 20, 21 assume automatically the wheel-lean angle setpoint in response to operation of the setpoint activation control 318.

The setpoint activation control 318 may include a push button 342 and a switch 344 configured to sense depression of the push button 342. The control 318 may be positioned in any suitable location, such as within the operator's station 13. For example, the control 318 may be supported on the lean control lever 338 within the operator's station 13, such as on a spherical knob of the lever 338, for movement relative thereto in response to manual operation (e.g., fingertip actuation) by the operator. In other examples, the control 318 may be positioned elsewhere within the operator's station 13, such as, for example, on a console (e.g., side console) or near a location of the operator's hand such as, for example, near a steering control or near a shifter.

The switch 344 may be, for example, a momentary switch such that manual operation of the push button 342 (i.e., depression of the push button 342) causes the switch 344 to output a wheel-lean request signal that is received by the WLC 326 and that is indicative of a request that the present wheel-lean angle of the wheels 20, 21 assume automatically the wheel-lean angle setpoint. The wheel-lean request signal may be an on/off signal, such that it is devoid of direction and magnitude content, merely requesting that the present wheel-lean angle of the wheels 20, 21 assume the setpoint automatically.

c. Manual Wheel-lean Control

An example system and method for manually controlling the lean angle θ is described in U.S. Pat. No. 8,412,420, filed Dec. 14, 2010 and entitled Wheel Lean Control, the entire disclosure of which is hereby expressly incorporated herein by reference.

Referring back to FIG. 7, a wheel-lean control unit 334 includes the WLC 326, the setpoint activation control 318, and a wheel-lean control 336. The wheel-lean control 336 may include a lean control lever 338 configured to move in fore and aft directions relative to its neutral to request that the front wheels 20, 21 lean toward the left and right at a desired lean speed corresponding to the displacement of the lever 338 and a position sensor 340 (e.g., Hall-effect sensor) configured to sense the direction and magnitude of the displacement of the lever 338 relative to neutral. In an example embodiment, the lever 338 may be included in a right pod of levers mounted to the forward end of the right armrest of the operator's seat in the operator's station 13. A left pod of levers may be similarly mounted to the left armrest. The levers of the right and left pods may be responsible for controlling various hydraulic functions. The lever 338 may be included in either pod.

Manual operation of the lever 338 causes the sensor 340 to output a signal that is received by the WLC 326 and that is indicative of the direction and magnitude of the displacement of the lever 338. The WLC 326 broadcasts a signal indicative of the direction and magnitude of the displacement of the lever 338 on the CAN bus 327, and HVC 322 receives that signal. The HVC 322 outputs a control signal to the applicable electro-hydraulic pilot valve 226 to cause the wheel-lean cylinder 58 to lean the wheels 20, 21 in the requested direction at the requested lean speed.

While this invention has been described as having example designs, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A work vehicle including:
a chassis having a moldboard rotatably mounted to the chassis by way of a grader circle;
a traction device supporting the chassis on the ground, the traction device operable to lean relative to the chassis such that a wheel-lean angle is defined by the traction device;
a sensor positioned to sense a vehicle parameter comprising a draft load exerted upon the chassis, a transverse inclination of the chassis, and a rotational position of the grader circle;
a wheel-lean actuator coupled to the traction device to lean the traction device; and
a control unit configured to receive and process a signal transmitted from the sensor to determine a desired wheel-lean angle, control the wheel-lean actuator based on the desired wheel-lean angle; and control a direction and magnitude of the wheel-lean angle based on a corresponding direction and magnitude of the rotational position of the grader circle with respect to a centered position, whereby the sensor indicates the draft load.

2. The work vehicle of claim 1, further comprising:
a wheel-lean angle sensor positioned to sense an indication of an actual wheel-lean angle; and
the control unit configured to receive a signal transmitted by the wheel-lean angle sensor, the control unit further configured to determine a disparity between the desired wheel-lean angle and sensed actual wheel-lean angle, the control unit further configured to control the wheel-lean actuator to reduce the disparity when the disparity is above a threshold.

3. The work vehicle of claim 2, wherein the control unit determines the disparity between the actual wheel-lean angle and the desired wheel-lean angle continuously.

4. The work vehicle of claim 1, wherein the work vehicle comprises a motor grader having a moldboard rotatably mounted to the chassis via a grader circle, the sensor comprising a torque sensor configured to measure a torque transmitted to the grader circle from the moldboard, the control unit receiving the signal indicative of the measured torque and processing the signal to approximate the draft load based on the measured torque.

5. The work vehicle of claim 1, wherein the work vehicle comprises a motor grader having a moldboard rotatably mounted to the chassis via a frame structure, the sensor comprising a strain gauge configured to measure a strain applied to the frame structure by the moldboard, the control unit receiving the signal indicative of the measured strain and processing the signal to approximate the draft load based on the measured strain.

6. The work vehicle of claim 1, wherein the work vehicle comprises a motor grader having a moldboard rotatably mounted to the chassis via a grader circle, the sensor comprising a pressure transducer disposed within an actuation cylinder operably connected to the grader circle or the moldboard.

7. The work vehicle of claim 6, wherein the actuation cylinder comprises at least one of:
a tilt cylinder configured to change a pitch of the moldboard relative to the grader circle;
a moldboard side-shift cylinder configured to laterally translate the moldboard along a longitudinal axis of the moldboard;
a blade-lift cylinder configured to raise and lower the moldboard; or
a circle side-shift cylinder configured to effect a side-shift of the grader circle and the moldboard.

8. The work vehicle of claim 1, further comprising a turn sensor positioned to sense an articulation angle of the chassis or a steering angle of the traction device, the turn sensor operably connected to the control unit such that the control unit receives a turn signal indicative of whether the work vehicle is executing a turn, the control unit configured to automatically lean the traction device in response to the turn signal.

9. The work vehicle of claim 1, further comprising a transport sensor positioned to sense at least one of: a speed of the work vehicle or a transmission status, wherein the transport sensor is operably connected to the control unit such that the control unit receives a transport signal indicative of whether the work vehicle is traveling at a threshold speed, wherein the control unit is configured to automatically lean the traction device to a set orientation in response to the transport signal.

10. The work vehicle of claim 1, further comprising an engine operably coupled to the traction device to propel the chassis across the ground, whereby the traction device is driven.

11. A work vehicle including: a chassis;
a moldboard rotatably mounted to the chassis by way of a grader circle;
a traction device supporting the chassis on the ground, the traction device operable to lean away from a neutral orientation relative to the chassis such that a wheel-lean angle is defined by the traction device;
a wheel-lean angle sensor positioned to sense an indication of an actual wheel-lean angle;
a sensor positioned to sense a force exerted upon the moldboard and transferred to the chassis;
a wheel-lean actuator coupled to the traction device to lean the traction device relative to the neutral orientation; and
a control unit configured to receive a signal transmitted from the sensor and determine a desired wheel-lean angle, determine a disparity between the desired wheel-lean angle and sensed actual wheel-lean angle, control the wheel-lean actuator to reduce the disparity when the disparity is above a threshold, and control a direction and magnitude of the wheel-lean angle based on a corresponding direction and magnitude of the rotational position of the grader circle with respect to a centered position, whereby the sensor indicates the draft load.

12. The work vehicle of claim 11, further comprising a second sensor positioned to sense a transverse inclination of the chassis, wherein the second sensor transmits a second signal indicative of the transverse inclination to the control unit, the control unit processing both the first and second signals to determine the desired wheel-lean angle.

13. The work vehicle of claim 11, wherein the moldboard is rotatably mounted to the chassis via a grader circle, the sensor comprising a torque sensor configured to measure a torque transmitted to the grader circle from the moldboard, the control unit receiving the signal indicative of the measured torque and processing the signal to approximate a draft load on the work vehicle based on the measured torque.

14. The work vehicle of claim 11, wherein the moldboard is rotatably mounted to the chassis via a frame structure, the sensor comprising a strain gauge configured to measure a strain applied to the frame structure by the moldboard, the control unit receiving the signal indicative of the measured strain and processing the signal to approximate a draft load on the work vehicle based on the measured strain.

15. The work vehicle of claim 11, wherein the moldboard is rotatably mounted to the chassis via a grader circle, the sensor comprising a rotation sensor configured to measure a rotational position of the grader circle, the control unit receiving the signal indicative of the measured rotational position and processing the signal to control a direction and magnitude of the wheel-lean angle based on a corresponding direction and magnitude of the rotational position of the grader circle with respect to a centered position.

16. The work vehicle of claim 11, further comprising a turn sensor positioned to sense an articulation angle of the chassis or a steering angle of the traction device, the turn sensor operably connected to the control unit such that the control unit receives a turn signal indicative of whether the work vehicle is executing a turn, the control unit configured to automatically lean the traction device in response to the turn signal.

17. The work vehicle of claim 11, further comprising a transport sensor positioned to sense at least one of: a speed of the work vehicle or a transmission status, the transport sensor operably connected to the control unit such that the control unit receives a transport signal indicative of whether the work vehicle is traveling at a threshold speed, the control unit configured to automatically return the traction device to the neutral orientation in response to the transport signal.

18. A method of operating a work vehicle, the work vehicle including a chassis and a traction device supporting the chassis on the ground, the traction device defining a wheel-lean angle, the method including the steps of:
- manually controlling a vehicle function comprising at least one of: vehicle speed, orientation and position of a moldboard, transmission gear, vehicle steering, or vehicle articulation;
- using a control unit to control the wheel-lean angle such that:
- the control unit measures of a draft load exerted upon the chassis or a transverse inclination of the chassis by receiving a first signal from a sensor;
- the control unit processes the first signal into a desired wheel-lean angle;
- the control unit controls a wheel-lean actuator such that the wheel-lean actuator changes the wheel-lean angle of the traction device to the desired wheel-lean angle; and
- the control unit controls a direction and magnitude of the wheel-lean angle based on a corresponding direction and magnitude of the rotational position of the grader circle with respect to a centered position, whereby the sensor indicates the draft load.

19. The method of claim 18, further comprising:
- using the control unit to compare the desired wheel-lean angle to an actual wheel-lean angle of the traction device, such that the control unit generates a wheel-lean angle disparity; and
- using the control unit to actuate the wheel-lean actuator to change the wheel-lean angle of the traction device to the desired wheel-lean angle when the wheel-lean angle disparity is at or above a threshold.

20. The method of claim 18, further comprising selectively manually controlling the wheel-lean angle by operating a lever to effect a change in the wheel-lean angle.

21. A method of controlling a wheel-lean angle of a traction device of a vehicle, the method comprising:
- sensing at least one of: a draft load exerted upon a chassis of the vehicle or a transverse inclination of the chassis, the step of sensing accomplished by transmitting a first signal to a control unit, the first signal emitted by a sensor indicative of the draft load;
- processing the first signal into a desired wheel-lean angle using the control unit;
- emitting an actuation signal from the control unit to actuate a wheel-lean actuator, such that the wheel-lean actuator changes the wheel-lean angle of the traction device to the desired wheel-lean angle; and
- controlling a direction and magnitude of the wheel-lean angle based on a corresponding direction and magnitude of the rotational position of the grader circle with respect to a centered position.

22. The method of claim 21, further comprising:
- using the control unit to compare the desired wheel-lean angle to an actual wheel-lean angle of the traction device to generate a wheel-lean angle disparity; and
- using the control unit to actuate the wheel-lean actuator to change the wheel-lean angle of the traction device to the desired wheel-lean angle when the wheel-lean angle disparity is at or above a threshold.

23. The method of claim 21, wherein the step of sensing the draft load comprises at least one of:
- measuring a strain on a frame structure attached to a moldboard of the vehicle;
- measuring a rotational orientation of the moldboard relative to a direction of travel of the vehicle; or
- measuring a torque applied to a grader circle to which the moldboard is mounted.

24. The method of claim 21, further comprising:
- using the control unit to receive a second signal indicative of at least one of: vehicle speed, transmission gear, vehicle articulation angle, or steering angle; and
- using the control unit to process the second signal together with the first signal into the desired wheel-lean angle.

* * * * *